Figures 1, 2, 3, 4, 5:
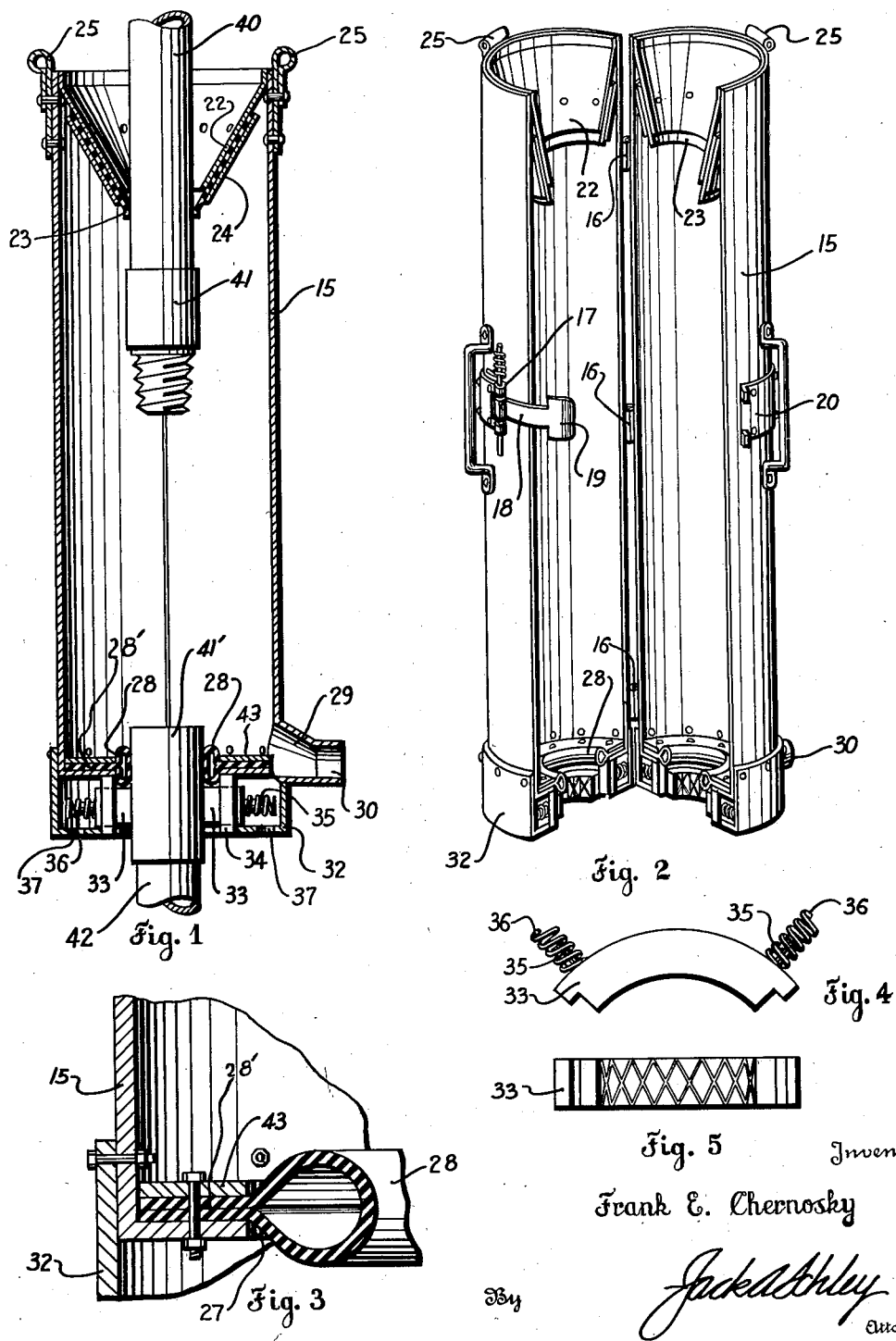

Oct. 26, 1937.  F. E. CHERNOSKY  2,096,882
FLUID SAVING DEVICE
Filed June 11, 1936   2 Sheets—Sheet 1

Inventor
Frank E. Chernosky
By Jack A. Ashley
Attorney

Oct. 26, 1937.     F. E. CHERNOSKY     2,096,882
FLUID SAVING DEVICE
Filed June 11, 1936     2 Sheets-Sheet 2
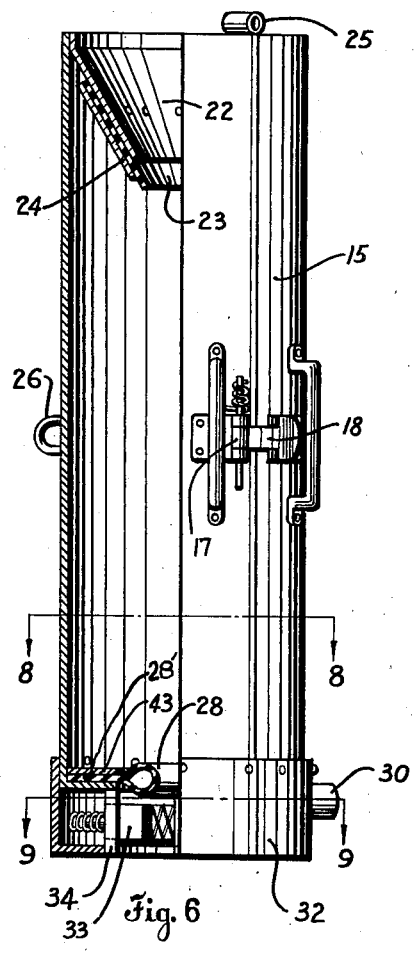
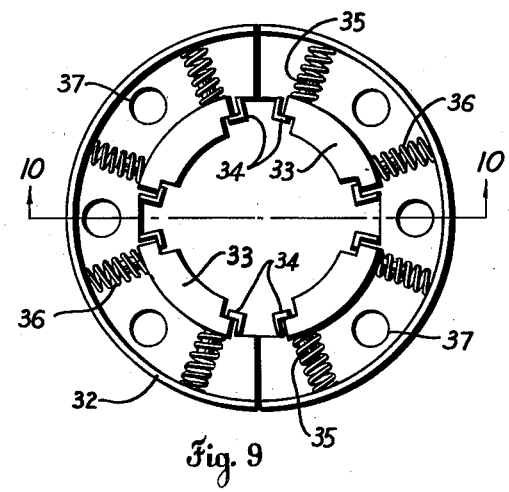
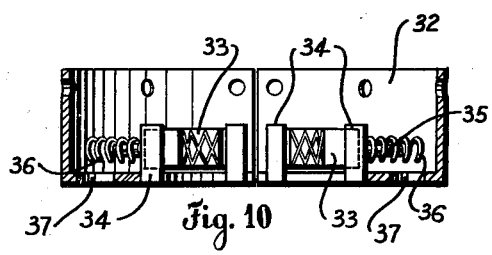
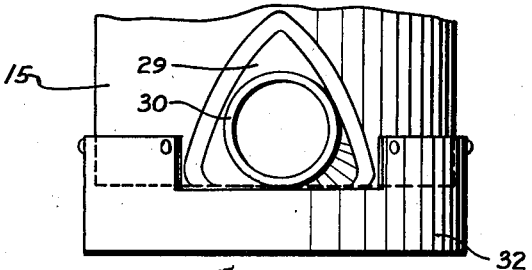
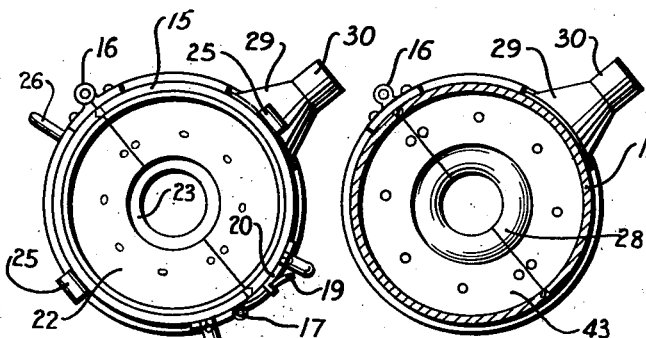
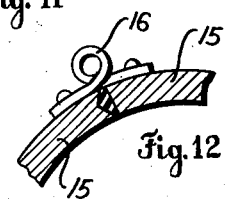
Inventor
Frank E. Chernosky
By Jack A. Ashley
Attorney Patented Oct. 26, 1937

2,096,882

UNITED STATES PATENT OFFICE 2,096,882

FLUID SAVING DEVICE

Frank E. Chernosky, Newgulf, Tex.

Application June 11, 1936, Serial No. 84,714

13 Claims. (Cl. 166—16)

This invention relates to new and useful improvements in fluid traps.

One object of the invention is to provide an improved fluid trap adapted to be used with well tubing for conserving the fluid from a well.

Another object of the invention is to provide a fluid trap adapted to be placed around the disconnected coupling of a pipe, so as to trap the fluid in said pipe, whereby the fluid may be conducted to a suitable disposition.

A further object of the invention is to provide a fluid trap so constructed that the fluid from an uncoupled string of pipe may be entrained and prevented from splashing and flowing on the machinery and floor of a well, whereby excessive wear on the machinery, the cable and the crown block is eliminated.

Another object of the invention is to provide an improved fluid trap so constructed that when engaged around tubing and the tubing is separated at the uncoupled joint, the ends of the pipe cannot be disengaged from the device.

In drilling wells, in some instances it is essential to keep the weight of the drilling fluid in the well so as to prevent the well from blowing out, and therefore, it is still another object of the invention to provide a fluid trap so arranged that the fluid of the well may be returned into the well, in order that the weight of the fluid in the well will remain approximately the same, whereby the blowing out of the well is prevented.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a vertical sectional view of the device constructed in accordance with the invention, showing tubing clamped within said device and separated so that fluid may flow therefrom, Figure 2 is an isometrical view of the device in an open position, Figure 3 is an enlarged detail of the packing means at the lower end of the device, Figure 4 is a plan view of one of the gripping blocks, Figure 5 is an elevation of the gripping block showing the gripping surface thereof, Figure 6 is a view, partly in section and partly in elevation, showing the device in a closed position, Figure 7 is a plan view of the same, Figure 8 is a horizontal cross sectional view taken on the line 8—8 of Figure 6, Figure 9 is a similar view taken on the line 9—9 of Figure 6, Figure 10 is a transverse vertical view taken on the line 10—10 of Figure 9, Figure 11 is an end elevation of the spout of said device, and Figure 12 is an enlarged detail of the hinge.

In the drawings the numeral 15 designates a tubular housing or casing which is split longitudinally so as to form two semicircular members. These members are pivoted along one longitudinal edge by suitable hinges 16, so that the members may be swung together or apart as desired. A suitable spring latch 17 is provided on the other longitudinal edge for fastening the two members together. The latch is provided with a tongue 18 having a head 19 on its outer end which engages the keeper 20. The outer end of the head is out-turned so as to present a thumb piece which may be readily engaged to swing said tongue so as to disengage the head 19 from the keeper 20 to unlock the latch.

The upper end of the housing 15 is provided with an internal, depending, inverted frustro conical skirt or member 22. This skirt is split and each half is secured to the corresponding half of the housing 15, so as to swing therewith. A cone shaped flexible member 23 has its lower end projecting below the skirt 22 to form a flexible lip. Each member 23 is fastened to the lower portion of each half of the skirt 22 by a suitable clamp or retaining plate 24. The member 23 may be made of rubber, rubber compound, Duprene, or any other suitable material as desired. It will be seen in Figure 1 that the lip 23 engages the tubing 40 just above the coupling or tool joint 41 and prevents leakage therearound. The clamping member 24 lends rigidity to the lip and acts as a guard therefor, so as to prevent the collars or tool joints 41 from cutting, pinching, or shearing said lip. The housing 15 is only placed around the tubing when the same has been uncoupled at one of the tool joints or collars. The tool joint 41, being enclosed within said housing, is separated, such as is shown in Figure 1. The upper section of the tubing 40 is connected to a suitable elevator (not shown) and the lower section 42 of the tubing is supported in the usual tubing slips (not shown).

It is preferable to suspend the housing 15 from the upper portion of the derrick by any suitable means (not shown). The upper end of the housing 15 is provided with hangers 25, which may be connected to any suitable suspending means. When said housing is not being used, it is usually swung to one side of the derrick and an external, horizontally extending hook 26 is provided on the housing, in order that any suitable latching means may engage said hook, so as to hold said housing over to one side, whereby it will be out of the way of the well and the tubing therein.

The lower end of the housing 15 is provided with an inwardly extending, annular flange 27 which forms a support for the hollow packing ring 28. The ring 28 is preferably made in two semicircular sections, which are mounted on the annular flange and are clamped thereon by semicircular clamping plates 43, which hold the rings in place. The packing rings 28 may be formed of rubber, Duprene, rubber compound or any suitable material. The packing ring 28 is hollow, as clearly shown in Figure 3, to make for flexibility and is provided with an outwardly directed flange 28' which overlies the flange 27 of the housing and the clamping plates 43 clamp the flange 28' so as to retain the packing rings in position, Figures 1, 3 and 6. It has been found in actual practice, that the diameter of a string of pipe will become worn through use, so that its outer diameters vary. Therefore, if a section of this worn pipe were connected in a new string of pipe, obviously a variation in outer diameters would be present. Similarly, one well may employ an entire string of new pipe while another well may have its string of pipe composed of worn sections. Thus the packing ring 28 is effective, regardless of the size of the pipe to which it is applied. As will be seen in Figure 1, a string of tubing, drill stem, or pipe may extend through the flange 27 and the packing ring 28 will engage the same, so as to pack off or close the lower end of the housing around said tubing. When the tubing is parted, (Figure 1) each section of tubing is retained within the ends of the housing and it will be seen that the housing is completely closed off at each end by the lip 23 and the rings 28, and that the fluid from the tubing will be trapped within the housing 15. A horizontally extending, funnel shaped spout 29 is provided at the lower end of the housing, so as to conduct the fluid from within said casing. The spout is preferably provided with a nipple 30, in order that a suitable hose or other conductor may be connected thereto, so as to lead the fluid to any predetermined disposal, such as a slush pit, a storage tank, the cellar of the well, or the casing thereof.

An annular, shallow chamber 32, which is cut into two semicircular members, so as to correspond with the halves of the housing 15, is secured on the lower end of said housing. A plurality of gripping members or blocks 33 are mounted within the housing, and as will be seen in Figures 1, 9 and 10, these blocks are disposed between upright, annular lugs or bars 34, which limit the inward radial movement of said blocks. The inner sides of the blocks are provided with grooves or teeth, while the outer surfaces have radially extending pins or studs 35 projecting therefrom. Coil springs 36 surround the pins and are confined between the blocks and the chamber, exerting their pressure to hold the blocks inwardly. The annular bars guide the blocks in their radial movement. It is pointed out that when a pipe is extending between the gripping blocks, the springs are partially compressed so that the pipe is securely gripped or engaged, whereby the same is prevented from slipping or moving from between said gripping blocks 33. Holes 37 may be provided in the bottom of the chamber so as to drain off any fluid therein.

In operation, the housing 15 is suspended from the upper portion of the derrick by any suitable means (not shown), and which may be connected to the hanger 25. When not in use, said casing is swung over to one side and the hook 26 engaged by any suitable means (not shown), so as to hold said housing out of the way. In pulling tubing, drill stem, or pipe from the well, the tubing is unscrewed but not separated. The housing 15 is then swung over to the tubing and closed around the tool joint or coupling of the tubing. The tongue 18 and head 19 of the latch 17 are engaged in the keeper 20.

The disconnected stand of tubing is now raised, until the position shown in Figure 1 is reached. The fluid in the elevated tubing is now freed to flow out thereof into the housing 15. It is pointed out that the packing rings 28 prevent said fluid from leaking around the lower end of the housing and the lips 23 prevent leakage around upper end, therefore said fluid is permitted to escape from the housing only through the spout 29. A suitable hose (not shown) is attached to the nipple 30, so as to conduct said fluid from the housing 15 to the predetermined disposal. Thus, it will be seen that the fluid from the uncoupled portion of the tubing is entrained and prevented from flowing and splashing upon the derrick floor and the draw works, and particularly on the drum containing the cable. When the drilling fluid, which contains a certain amount of sand, splashes onto the cable, the same is cut and weakened and also in passing over the sheaves of the crown block (not shown) the sand on the cable will have a tendency to deepen the channel on said sheaves (not shown). By entraining the fluid undue wear on the crown block and the draw works is prevented, so that when a fresh or new cable is used the same is not pinched and prematurely worn out, as would occur if the channel of the sheaves were worn or deepened.

What I claim and desire to secure by Letters Patent is:

1. A fluid trap including, a housing adapted to receive the uncoupled ends of a pipe, and means for packing off around each section of the separated pipe, whereby fluid entering the housing from said pipe is trapped within said housing, said means being arranged to snugly engage pipes of varying diameters.

2. A fluid trap including, a housing adapted to receive the uncoupled ends of a pipe, means for packing off around each section of the separated pipe, whereby fluid entering the housing from said pipe is trapped within said housing, said means being arranged to snugly engage pipes of varying diameter, and an outlet for conducting the trapped fluid from the housing.

3. A fluid trap including, a housing adapted to receive the uncoupled ends of a pipe, means for fastening the housing on the separated sections of the pipe to prevent disengagement of the housing therefrom, and means for packing off around each section of the separated pipe, whereby fluid entering the housing from said pipe is trapped within said housing, said means being arranged to snugly engage pipes of varying diameters.

4. A fluid trap including, a housing adapted to receive the uncoupled ends of a pipe, means for fastening the housing on the separated sections of the pipe to prevent disengagement of the housing therefrom, means for packing off around each section of the separated pipe, whereby fluid entering the housing from said pipe is trapped within said housing, said means being arranged to snugly engage pipes of varying diameters, and an outlet for conducting the trapped fluid from the housing.

5. A fluid trap including, a housing adapted to receive the uncoupled ends of a pipe, adjustable means for packing off around each section of the separated pipe for snugly engaging pipes of varying diameters, whereby fluid entering the housing from said pipe is trapped within said housing, and spring pressed gripping elements on the housing for clamping said pipe.

6. A fluid trap including, a housing adapted to receive the uncoupled ends of a pipe, means for fastening the housing on the separated sections of the pipe, adjustable means for packing off around each section of the separated pipe for snugly engaging pipes of varying diameters, whereby fluid entering the housing from said pipe is trapped within said housing, and spring pressed gripping elements on said housing for clamping the pipe to prevent disengagement of the housing therefrom.

7. A fluid trap including, a housing adapted to receive the uncoupled ends of a pipe, means for packing off around each section of the separated pipe, whereby fluid entering the housing from said pipe is trapped within said housing, said means being arranged to snugly engage pipes of varying diameters, an outlet for conducting the trapped fluid from the housing, and means for suspending the housing and holding the housing to one side, whereby the same is out of the way when not in use.

8. A fluid trap including, a housing adapted to receive the uncoupled ends of a pipe, means for fastening the housing on the separated sections of the pipe, means for packing off around each section of the separated pipe, whereby fluid entering the housing from said pipe is trapped within said housing, said packing means being arranged to snugly engage pipes of varying diameters, and gripping means on said housing for clamping the pipe to prevent disengagement of the housing therefrom.

9. A fluid trap including, a housing adapted to receive the uncoupled ends of a pipe, means for packing off around each section of the separated pipe, whereby fluid entering the housing from said pipe is trapped within said housing, an outlet for conducting the trapped fluid from the housing, means on said housing for positively gripping the pipe to prevent disengagement of the housing therefrom, said housing comprising a pair of complemental longitudinal sections hinged together along one edge of each section, handles and locking means adjacent to the other edges of the sections, and means adjacent to the hinged edges of the housing sections for suspending the housing and holding the housing to one side, whereby the same is out of the way when not in use.

10. A fluid trap including, a housing adapted to receive the uncoupled ends of a pipe, means for packing off around each section of the separated pipe, whereby fluid entering the housing from said pipe is trapped within said housing, said means being arranged to snugly engage pipes of varying diameters, an outlet for conducting the trapped fluid from the housing, means on said housing for positively gripping the pipe to prevent disengagement of the housing therefrom, and means for suspending the housing and holding the housing to one side, whereby the same is out of the way when not in use.

11. A fluid trap including, a housing adapted to receive the uncoupled ends of a pipe, means for packing off around each section of the separated pipe, whereby fluid entering the housing from said pipe is trapped within said housing, said packing means being adapted to snugly engage pipes of varying diameters, and means for positively gripping said pipe to prevent disengagement of the housing therefrom.

12. A fluid trap including, a housing adapted to receive the uncoupled ends of a pipe, means for fastening the housing on the separated sections of pipe, means at the upper and lower ends of the housing for packing off around each section of the separated pipe, whereby fluid entering the housing from said pipe is trapped within said housing, said packing means being arranged for a seal around said pipes of varying diameters, gripping means on said housing for clamping the pipe to prevent disengagement of said housing therefrom, and an outlet for conducting the trapped fluid from said housing.

13. A fluid trap including, a split housing adapted to receive the uncoupled end of a pipe, means for fastening the housing on the separated sections of pipe, flexible means at the upper end of the housing for sealing around the upper section of the separated pipe, hollow flexible packing at the lower end of the housing for sealing around the lower section of the separated pipe, whereby fluid entering the housing from said pipe is trapped within said housing, spring pressed gripping blocks on the housing below the hollow packing for clamping pipe of varying diameters to prevent disengagement of said housing from said pipe, and an outlet for conducting the trapped fluid from said housing.

FRANK E. CHERNOSKY.